(12) United States Patent
Nitta et al.

(10) Patent No.: US 12,517,251 B2
(45) Date of Patent: Jan. 6, 2026

(54) IMAGING APPARATUS

(71) Applicant: KOITO MANUFACTURING CO., LTD., Tokyo (JP)

(72) Inventors: Kento Nitta, Shizuoka (JP); Shintaro Sugimoto, Shizuoka (JP); Yuta Haruse, Shizuoka (JP); Teruaki Torii, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 927 days.

(21) Appl. No.: 17/727,983

(22) Filed: Apr. 25, 2022

(65) Prior Publication Data

US 2022/0244389 A1 Aug. 4, 2022

Related U.S. Application Data

(63) Continuation of application No. PCT/JP2020/038836, filed on Oct. 14, 2020.

(30) Foreign Application Priority Data

Oct. 23, 2019 (JP) .................................. 2019-192624
Nov. 19, 2019 (JP) .................................. 2019-208619

(51) Int. Cl.
*G01S 17/89* (2020.01)
*B60Q 1/24* (2006.01)
(Continued)

(52) U.S. Cl.
CPC .............. *G01S 17/89* (2013.01); *B60Q 1/249* (2022.05); *G01S 17/10* (2013.01); *G01S 17/931* (2020.01)

(58) Field of Classification Search
CPC .......... G01S 17/18; G01S 7/486; G01S 17/26; G01S 7/4816; G01S 13/10; G01S 13/08;
(Continued)

(56) References Cited

U.S. PATENT DOCUMENTS

| | | | |
|---|---|---|---|
| 10,352,863 B1 * | 7/2019 | Pohl | G01S 7/4802 |
| 2018/0224552 A1 | 8/2018 | Wang et al. | |
| 2020/0355804 A1 * | 11/2020 | Nauen | G01S 7/484 |

FOREIGN PATENT DOCUMENTS

| | | |
|---|---|---|
| JP | 2009276248 A | 11/2009 |
| JP | 6412673 B1 | 10/2018 |

(Continued)

OTHER PUBLICATIONS

WO-2018124285-A1 (Year: 2018).*
(Continued)

*Primary Examiner* — Sanjiv D. Patel
(74) *Attorney, Agent, or Firm* — Buchanan Ingersoll & Rooney PC

(57) ABSTRACT

In an imaging apparatus, a distance measurement sensor detects the distance to a target TGT. An illumination apparatus sequentially irradiates reference light S1 having a spatially random intensity distribution. A photodetector measures reflected light S2 from an object OBJ. A calculation processing device applies a time window that corresponds to an output of the distance measurement sensor to an output of the photodetector, and calculates a correlation between the detection intensity based on the signal included in the time window and the intensity distribution of the reference light so as to reconstruct a reconstructed image of the target.

9 Claims, 14 Drawing Sheets

(51) Int. Cl.
   *G01S 17/10*     (2020.01)
   *G01S 17/931*    (2020.01)
(58) Field of Classification Search
   CPC ...... G01S 13/06; G01S 7/4865; G01S 17/894;
         G01S 7/4811; G01S 17/36; G01S 17/86;
         G01S 17/08; G01S 17/10; G01S 17/89;
         G01S 7/484; G01S 17/48; G01S 17/46;
         G01S 17/42; G01S 17/88; G01S 17/93;
                G01S 17/06; G01S 19/42
   See application file for complete search history.

(56)              References Cited

FOREIGN PATENT DOCUMENTS

| WO | WO-2018124285 A1 * | 7/2018 | ............ G01N 21/01 |
| WO | 2018225684 A1 | 12/2018 | |
| WO | 2019016994 A1 | 1/2019 | |

OTHER PUBLICATIONS

International Search Report (PCT/ISA/210) mailed on Dec. 22, 2020, by the Japan Patent Office as the International Searching Authority, and International Preliminary Report on Patentability with Written Opinion (PCT/ISA/237) mailed on Apr. 26, 2022, for International Application No. PCT/JP2020/038836.

* cited by examiner

IMAGING APPARATUS

BACKGROUND

1. Technical Field

The present disclosure relates to an imaging apparatus using correlation calculation.

2. Description of the Related Art

In order to support autonomous driving or autonomous control of the light distribution of a headlamp, an object identification system is employed for sensing the position and the kind of an object that exists in the vicinity of a vehicle. The object identification system includes a sensor and a calculation processing device configured to analyze the output of the sensor. As such a sensor, a desired one is selected from among a camera, LiDAR (Light Detection and Ranging, Laser Imaging Detection and Ranging), millimeter-wave radar, ultrasonic sonar, etc., giving consideration to the usage, required precision, and cost.

As one from among imaging apparatuses (sensors), an imaging apparatus (which will also be referred to as a "quantum radar camera" hereafter) using the principle of ghost imaging is known. In ghost imaging, reference light is irradiated to an object while randomly switching the intensity distribution (pattern) of the reference light, and the light intensity of the reflected light is detected and measured for each pattern. The light intensity is detected as the energy over a given plane or the integrated value of the intensity. That is to say, the light intensity is not detected as an intensity distribution. With this, by calculating the correlation between each pattern and the detected light intensity, a reconstructed image of the object is obtained.

Problem 1. As a result of investigating conventional quantum radar cameras, the present inventors have recognized the following problem 1. FIG. 1 is a diagram showing an image capture situation supported by a conventional quantum radar camera. There is dense fog 6 between a quantum radar camera 2 and a target 4. The quantum radar camera 2 irradiates reference light S1 having a randomly modulated intensity distribution (pattern) to the front side, and detects the intensity of the reflected light S2 from the target 4. Such a measurement is repeated while changing the pattern of the reference light S1, and correlation calculation is executed so as to reconstruct an image of the target 4.

FIG. 2 is a diagram showing a time chart of the image capture situation shown in FIG. 1. In the upper diagram, the reference light output from the quantum radar camera is shown. In the lower diagram, the reflected light incident to the quantum radar camera is shown. At the time point to, the reference light having a given modulated pattern is irradiated. A part of the reference light is reflected by the fog 6, and the reflected light is incident to the quantum radar camera at the time point $t_1$. With the distance between the quantum radar camera 2 and the fog 6 as $d_1$, the relation $t_1 = t_0 + 2 \times d_1/c$ holds true. Here, c represents the speed of light.

The other part of the reference light passes through the fog 6, and is reflected by the target 4. Subsequently, the reflected light passes through the fog again, and is incident to the quantum radar camera 2. With the distance between the quantum radar camera 2 and the target 4 as $d_2$, the relation $t_2 = t_0 + 2 \times d_2/c$ holds true.

The component b of the reflected light incident to the quantum radar camera 2 in a period from the time point $t_2$ to the time point $t_3$ has a correlation with the shape of the target 4. However, the component a of the reflected light incident to the quantum radar camera 2 in a period from the time point $t_1$ to the time point $t_2$ is noise having no correlation with the shape of the target 4. With the conventional quantum radar camera 2, the correlation is calculated based on the light intensity detected by integration of the components a and b of the reflected light by a photodetector thereof. Such an arrangement has a problem of the occurrence of degradation in the image quality when there is fog or the like.

Problem 2. As a result of investigating conventional quantum radar cameras, the present inventors have recognized the following problem 2. FIG. 3A is a diagram showing an image capture situation supported by a conventional quantum radar camera. FIG. 3B is a diagram showing an image acquired in the image capture situation shown in FIG. 3A. In the image capture situation shown in FIG. 3A, there are multiple objects 4 at different distances from the quantum radar camera 2. The quantum radar camera 2 irradiates reference light S1 having a randomly modulated intensity distribution (pattern) to the front side, and detects the intensity of the reflected light S2 from each target 4. Such a measurement is repeated while changing the pattern of the reference light S1, and correlation calculation is executed so as to reconstruct an image of the multiple targets 4 shown in FIG. 3B.

In this situation, the reflected light from a farther object 4b has an intensity that is smaller than the intensity of the reflected light from a nearer object 4a. Accordingly, in a case in which there are multiple objects at different distances in a single frame, this leads to a problem of an image of the farther object becoming indistinct.

SUMMARY

1. An embodiment of the present disclosure relates to an imaging apparatus. The imaging apparatus includes: a distance measurement sensor structured to detect the distance to a target; an illumination apparatus structured to irradiate reference light while sequentially switching multiple reference light having spatially random intensity distributions; a photodetector structured to measure reflected light from an object; and calculation processing device structured to apply a time window that corresponds to an output of the distance measurement sensor to an output of the photodetector, and to calculate a correlation between a detection intensity based on a signal included in the time window and the intensity distribution of the reference light so as to reconstruct a reconstructed image of the target.

2. An embodiment of the present disclosure relates to an imaging apparatus. The imaging apparatus includes: an illumination apparatus structured to irradiate reference light while sequentially switching multiple reference light having spatially random intensity distributions; a photodetector structured to measure reflected light from an object; and a calculation processing device structured to divide the waveform of an output signal of the photodetector into multiple time slots, to generate a detection intensity for each time slot, and to calculate a correlation between a detection intensity and the intensity distribution of the reference light so as to reconstruct a reconstructed image.

It is to be noted that any arbitrary combination or rearrangement of the above-described structural components and so forth is effective as and encompassed by the present embodiments. Moreover, all of the features described in this summary are not necessarily required by embodiments so that the embodiment may also be a sub-combination of these described features. In addition, embodiments may have other features not described above.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Figure 1:
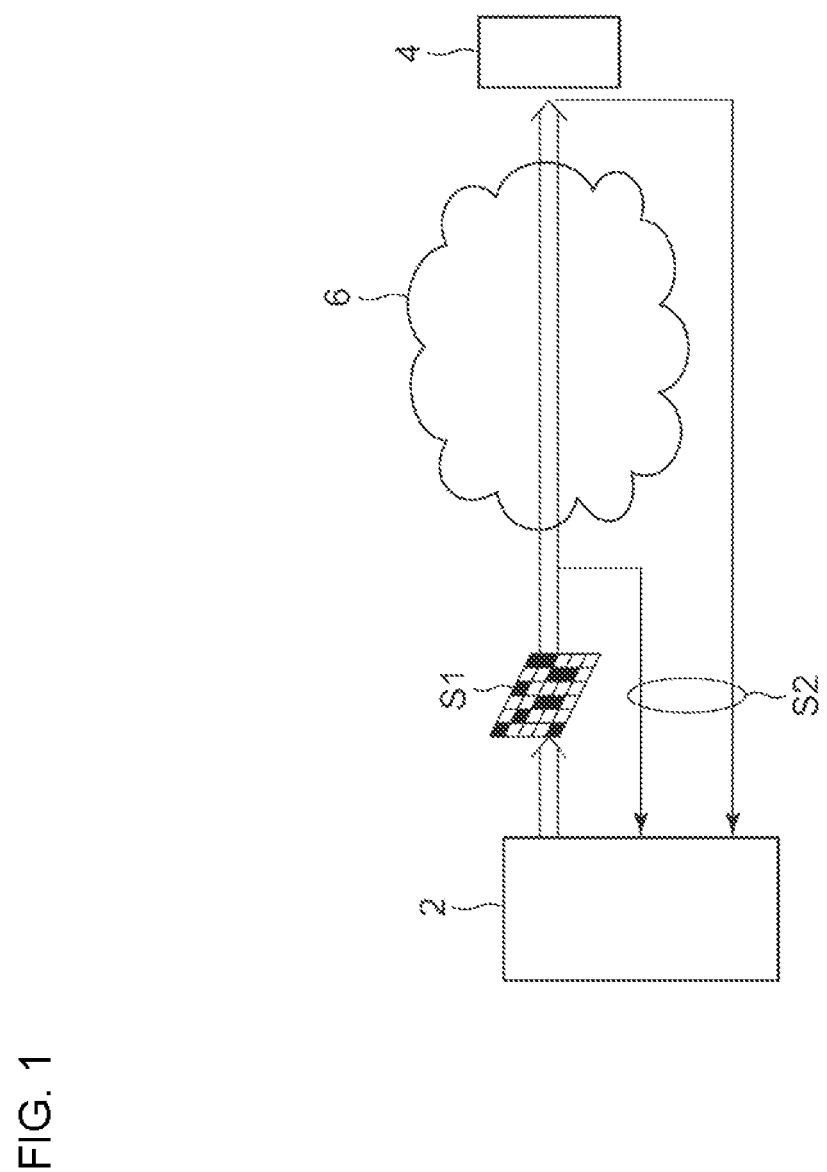
FIG. 1 is a diagram showing an image capture situation supported by a conventional quantum radar camera.
Figure 2:
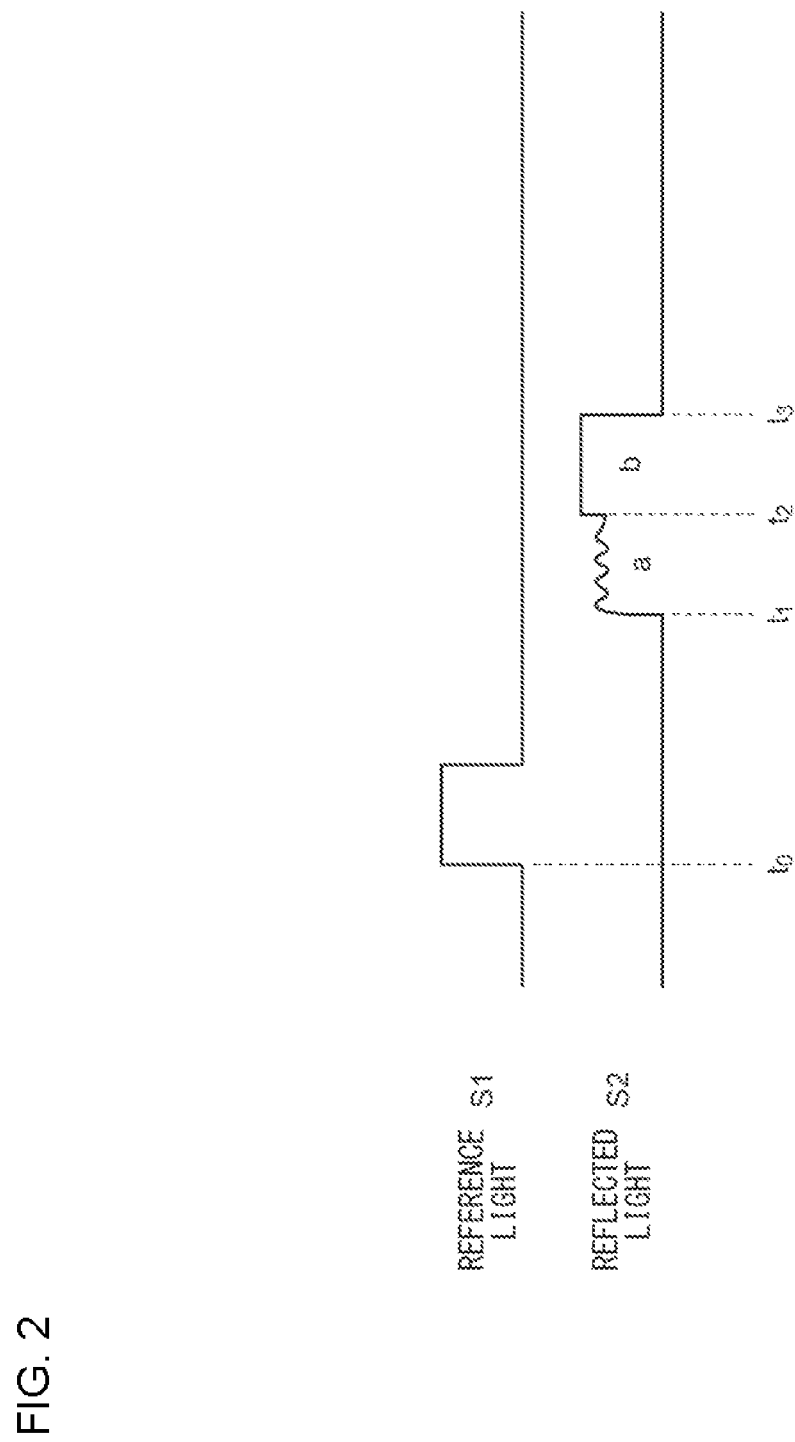
FIG. 2 is a time chart showing the image capture situation shown in FIG. 1.
Figure 3A:
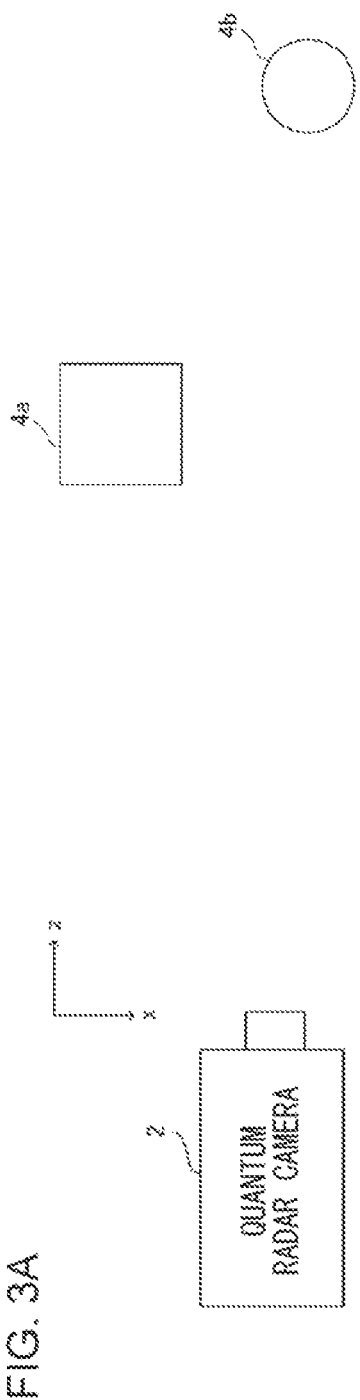
FIG. 3A is a diagram showing an image capture situation supported by a conventional quantum radar camera.
Figure 3B:
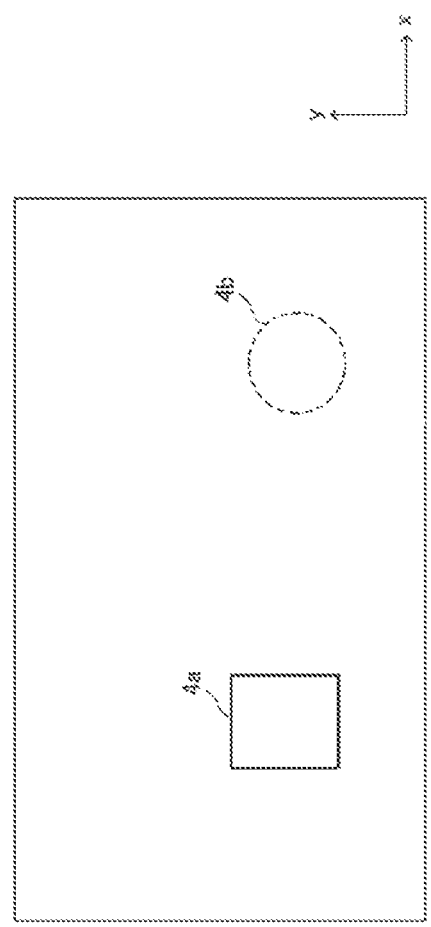
FIG. 3B is a diagram showing an image acquired in the image capture situation shown in FIG. 3A.

An outline of several example embodiments of the disclosure follows. This outline is provided for the convenience of the reader to provide a basic understanding of such embodiments and does not wholly define the breadth of the disclosure. This outline is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

The "random light intensity distribution" in the present specification does not mean that the light intensity distribution is completely random. Rather, the light intensity distribution may be random to an extent that allows an image to be reconstructed by ghost imaging. Accordingly, "random" in the present specification may include a certain degree of regularity. Also, "random" does not require the light intensity distribution to be completely unpredictable. That is to say, the light intensity distribution may also be predictable and reproducible.

An embodiment disclosed in the present specification relates to an imaging apparatus. The imaging apparatus includes: a distance measurement sensor structured to detect the distance to a target; an illumination apparatus structured to irradiate reference light while sequentially switching multiple reference light having spatially random intensity distributions; a photodetector structured to measure reflected light from an object; and calculation processing device structured to apply a time window that corresponds to an output of the distance measurement sensor to an output of the photodetector, and to calculate a correlation between the detection intensity based on a signal included in the time window and the intensity distribution of the reference light so as to reconstruct a reconstructed image of the target.

With this arrangement, only the reflected light from the target is extracted and used for correlation calculation. This allows non-target-related effects to be removed, thereby providing improved image quality.

In an embodiment, a light-receiving unit of the distance measurement sensor and the photodetector may be configured as a common component. This is capable of suppressing an increase in costs due to an additional distance measurement sensor.

In an embodiment, a light-emitting unit of the distance measurement sensor and the illumination apparatus may be configured as a common light source. This is capable of suppressing an increase in costs due to an additional distance measurement sensor.

An embodiment disclosed in the present specification relates to an imaging apparatus. The imaging apparatus includes: an illumination apparatus structured to irradiate reference light while sequentially switching multiple reference light having spatially random intensity distributions; a photodetector structured to measure reflected light from an object; and the calculation processing device structured to divide the waveform of an output signal of the photodetector into multiple time slots, to generate a detection intensity for each time slot, and to calculate a correlation between the detection intensity and the intensity distribution of the reference light so as to reconstruct a reconstructed image.

The reflected light from multiple objects at different distances is incident to the photodetector at different time points. Accordingly, the waveform of the output signal of the photodetector is divided into multiple time slots, and is processed for each time slot. With such an arrangement, multiple objects located at different distances can be separated, and the detection intensity can be acquired for each object. A reconstructed image obtained for each object by calculating a correlation for each object has improved image quality as compared with that of a single reconstructed image including multiple objects. "Improved image quality" as used here means improved visibility and improved results or precision obtained in signal processing of the reconstructed image.

In an embodiment, the ratio of the detection intensity with respect to the intensity of light incident to the photodetector (i.e., gain) may be raised as the time slot becomes later. This is capable of compensating for the intensity of the reflected light that decreases according to an increase of the distance to the object. This provides further improved image quality.

In an embodiment, the calculation processing device may include a digitizer structured to convert an output signal of the photodetector into a digital signal. Also, the width of 1 LSB (Least Significant Bit) of the digitizer may be increased as the time slot becomes later.

In an embodiment, the digitizer may include a single A/D converter. Also, a reference voltage to be supplied to the A/D converter may be lowered as the time slot becomes later.

In an embodiment, the digitizer may include multiple A/D converters to which different reference voltages are supplied. Also, the multiple A/D converters may each be used for a corresponding time slot in a time-division manner.

In an embodiment, the imaging apparatus may include at least one photodetector having a different sensitivity. Also, as the time slot becomes later, a photodetector having a higher sensitivity may be used.

The delay time τ from a given timing at which the reference light is irradiated up to a timing at which the reflected light reflected by an object located at a distance d is incident to the photodetector is represented by the following Expression.

$$\tau = 2 \times d/c$$

Here, c represents the speed of light. With this, τ can be associated with the time difference between the irradiation of the reference light and the time slot. Accordingly, the reconstructed image generated for each time slot may be stored in a form in which it is associated with the distance information that corresponds to the time information with respect to each time slot. This allows the imaging apparatus to function as a distance measurement sensor.

EMBODIMENTS

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 4:
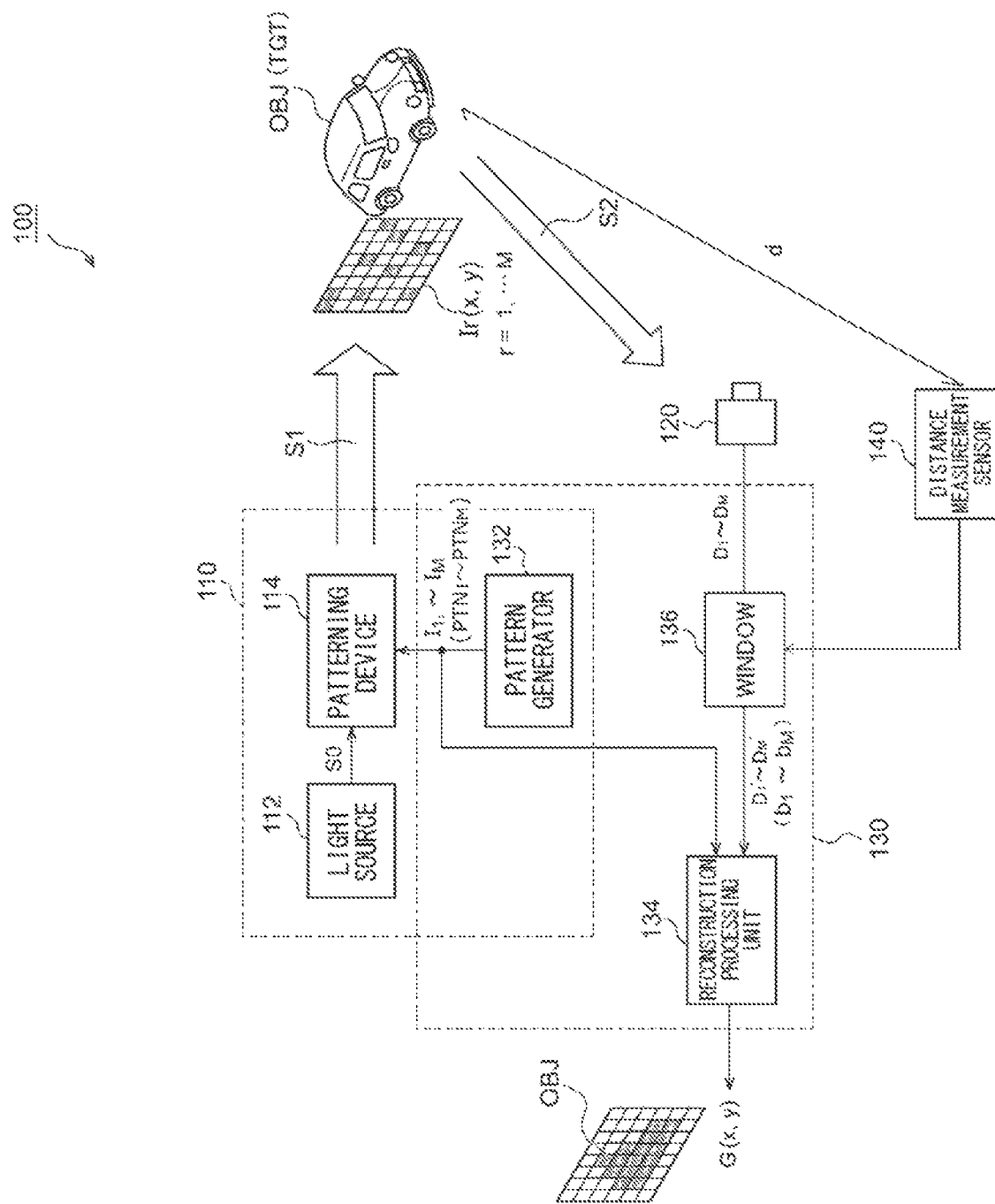
FIG. 4 is a diagram showing an imaging apparatus according to an embodiment 1.

FIG. 4 is a diagram showing an imaging apparatus 100 according to an embodiment 1. The imaging apparatus 100 is configured as a correlation function image sensor using the principle of ghost imaging. The imaging apparatus 100 includes an illumination apparatus 110, a photodetector 120, a calculation processing device 130, and a distance measurement sensor 140. The imaging apparatus 100 will also be referred to as a "quantum radar camera".

The distance measurement sensor 140 measures the distance d to a target TGT selected from among the multiple objects OBJ located in front of the imaging apparatus 100. The method employed by the distance measurement sensor 140 is not restricted in particular. As the distance measurement sensor 140, millimeter-wave radar, etc. may be employed.

The illumination apparatus 110 is configured as a pseudo-thermal light source. The illumination apparatus 110 generates reference light S1 having a spatial intensity distribution I(x,y) that can be regarded as substantially random, and irradiates the reference light S1 to the object OBJ. The reference light S1 is irradiated to the object OBJ while changing the intensity distribution at random a plurality of M times.

The illumination apparatus 110 includes a light source 112, a patterning device 114, and a pattern generator 132. The light sources 112 generates light S0 having a uniform intensity distribution. As such a light source 112, a laser, light-emitting diode, or the like may be employed. The wavelength and the spectrum of the reference light S1 are not restricted in particular. As the reference light S1, white light having multiple wavelengths or a continuous spectrum may be employed. Also, monochromatic light having a predetermined wavelength may be employed. The reference light S1 may also have a wavelength in the infrared region or ultraviolet region.

The patterning device 114 has multiple pixels arranged in a matrix. The patterning device 114 is configured to be capable of spatially modulating the light intensity distribution I based on the combination of the on/off states of the multiple pixels. In the present specification, a pixel set to the on state will be referred to as an "on pixel". On the other hand, a pixel set to the off state will be referred to as an "off pixel". It should be noted that, in the following description, for ease of understanding, description will be made assuming that each pixel is settable to only two values, i.e., 1 and 0. However, the present invention is not restricted to such an arrangement. Also, each pixel may be settable to an intermediate value.

As the patterning device 114, a reflective Digital Micromirror Device (DMD) or a transmissive liquid crystal device may be employed. The patterning device 114 receives the supply of a pattern signal PTN (image data) generated by the pattern generator 132.

The pattern generator 132 generates a pattern signal PTN$_r$ that indicates the light intensity distribution I$_r$ of the reference light S1. The pattern generator 132 switches the pattern signal PTN$_r$ (r=1, 2, . . . , M) with time.

The photodetector 120 measures the reflected light from the object OBJ, and outputs a detection signal D$_r$. The detection signal D$_r$ includes reflected light from objects OBJ that differ from the target. The detection signal D$_r$ is a spatially integrated value of the light energy (or intensity) incident to the photodetector 120 when the reference light having the light intensity distribution I$_r$ is irradiated to the object OBJ. Accordingly, as the photodetector 120, a single-pixel photodetector can be employed. The photodetector 120 outputs multiple detection signals D$_1$ through D$_M$ that respectively correspond to the plurality of M kinds of light intensity distributions I$_1$ through I$_M$. The photodetector 120 outputs an analog electrical signal, which is converted into a digital signal by means of an A/D converter. The digital signal thus converted is acquired by the calculation processing device 130.

The calculation processing device 130 applies a time time window that corresponds to the output of the distance measurement sensor 140 to the time wavelength of the detection signal D$_r$ that is an output of the photodetector 120, so as to extract the signal D$_r$' included in the time window. Subsequently, the calculation processing device 130 calculates the correlation between the detection intensity b$_r$ based on the signal component D$_r$' and the intensity distribution I$_r$(x,y) of the reference light, so as to reconstruct a reconstructed image G(x,y) of the target TGT.

The calculation processing device 130 includes a pattern generator 132, a reconstruction processing unit 134, and a window processing unit 136. The window processing unit 136 receives the output of the distance measurement sensor 140, i.e., distance information d to the target TGT. The window processing unit 136 generates a time window WIND that opens after a period of time τ that corresponds to the distance information d elapses from a light emission timing of the illumination apparatus 110. The period of time τ can be determined as follows.

τ=2×d/c

The length Tw of the time window WIND may be set to the same order as the pulse width (duration) of the reference light S1.

The window processing unit 136 receives the detection signal $D_r$ based on the output of the photodetector 120, and applies the time window WIND to the detection signal $D_r$ thus received so as to extract the signal component $D_r'$ included in the period Tw during which the time window WIND is open.

The configuration of the window processing unit 136 is not restricted in particular. The window processing unit 136 may be configured in the digital domain. Also, the window processing unit 136 may be configured in the analog domain. For example, the waveform of the detection signal $D_r$ converted into a digital signal by means of an A/D converter (digitizer) may be input to the window processing unit 136, so as to cut out part of the waveform according to the distance. Alternatively, an A/D converter may be employed as the window processing unit 136. Specifically, the A/D converter may be operated such that the data acquisition period thereof matches the period during which the time window WIND is open.

The reconstruction unit 134 generates the detection intensity $b_r$ based on the signal component $D_r'$ extracted by the window processing unit 136.

The relation between the detection intensity $b_r$ and the detection signal $D_r'$ may preferably be determined giving consideration to the kind of the photodetector 120, the method of detection, etc.

Description will be made assuming that the reference light S1 having a given light intensity distribution $I_r$ is irradiated for a given illumination period. Also, description will be made assuming that the detection signal $D_r'$ represents an amount of light received at a given time point (or for an infinitesimal time), i.e., an instantaneous value thereof. In this case, the detection signal $D_r'$ may be sampled multiple times in the illumination period. Also, as the detection intensity $b_r$, an integrated value, an average value, or the maximum value of the detection signal $D_r'$ may be employed. Alternatively, from among all the sampled values, some may be selected and used to calculate such an integrated value, average value, or maximum value, to be employed as the detection intensity $b_r$. For the selection of the multiple sampled values, x-th through y-th sampled values may be extracted in descending order from the maximum value, for example. Also, sampled values that are smaller than an arbitrary threshold value may be excluded. Also, sampled values with small signal fluctuation may be extracted.

The reconstruction processing unit 134 calculates the correlation between the multiple intensity distributions (which will also be referred to as "random patterns") $I_1$ through $I_M$ and the multiple detection intensities $b_1$ through $b_M$, so as to reconstruct the reconstructed image G(x, y) of the object OBJ. The correlation calculation is executed using the following Expression 1.

$$G(x, y) = \frac{1}{M}\sum_{r=1}^{M}[\{b_r - \langle b \rangle\} \cdot I_r(x, y)] \quad (1)$$

$$\langle b \rangle = \frac{1}{M}\sum_{r=1}^{M} b_r$$

The calculation processing device 130 can be implemented as a combination of a processor (hardware component) such as a Central Processing Unit (CPU), Micro Processing Unit (MPU), microcontroller or the like and a software program to be executed by the processor (hardware component). The calculation processing device 130 may be configured as a combination of multiple processors. Alternatively, the calculation processing device 130 may be configured as hardware only.

The above is the configuration of the imaging apparatus 100. Next, description will be made regarding the operation thereof.

Figure 5:
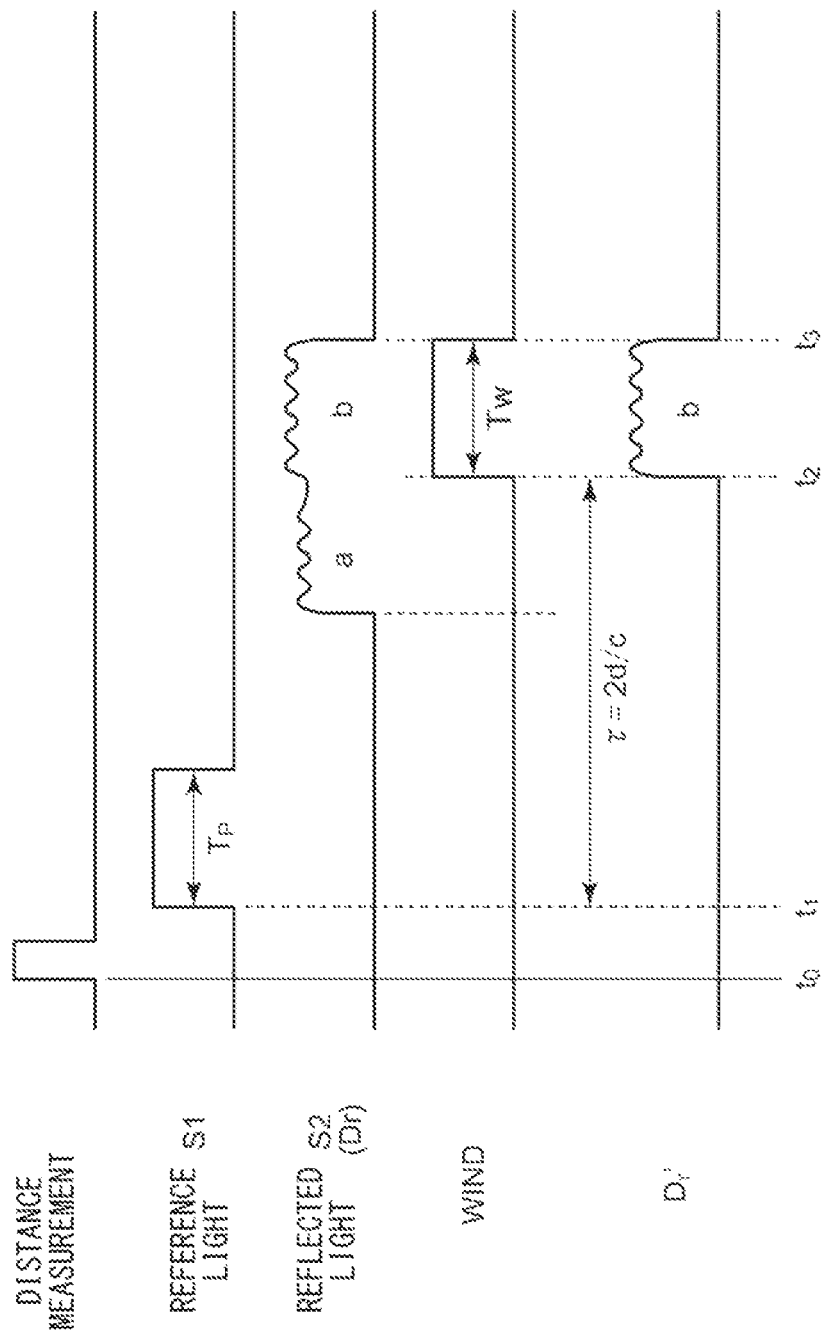
FIG. 5 is a time chart showing the operation of the imaging apparatus shown in FIG. 4 in the image capture situation shown in FIG. 1.

Returning to the image capture situation shown in FIG. 1, description will be made regarding the operation when the imaging apparatus 100 according to the embodiment 1 is used instead of the conventional quantum radar camera 2. FIG. 5 is a time chart showing the operation of the imaging apparatus 100 shown in FIG. 4 in the image capture situation shown in FIG. 1. At the time point $t_0$ before the irradiation of the reference light S1, the distance measurement sensor 140 detects the distance d to the target 4. The reference light S1 having one pattern is irradiated during a period Tp from the time point $t_1$. The reference light S1 is reflected by the fog 6 and the target 4 in front of the imaging apparatus 100, and is incident to the photodetector 120. In this image capture situation, the reflected light S2 incident to the photodetector 120 includes a reflected light component from the fog 6 and a reflected light component from the target 4. That is to say, the detection signal $D_r$ includes a single component a that corresponds to the fog 6 and a signal component b that corresponds to the target 4.

The window signal WIND is opened at the time point $t_2$ after a period τ(=2×d/c) from the time point $t_1$, and is maintained in the open state during a predetermined period of time Tw. The open period of the window is set such that it substantially matches the period in which the reflected light from the target 4 is incident to the photodetector 120. Accordingly, such an arrangement is capable of extracting the signal $D_r'$ including only the signal component b using the window signal WIND. The correlation is calculated using the detection intensity $b_r$ based on the signal $D_r'$ thus extracted. This allows the effect of the fog 6 to be reduced, thereby providing the reconstructed image of the target 4 with improved sharpness. As described above, with the imaging apparatus 100 according to the embodiment 1, this provides improved image quality.

Figure 6:
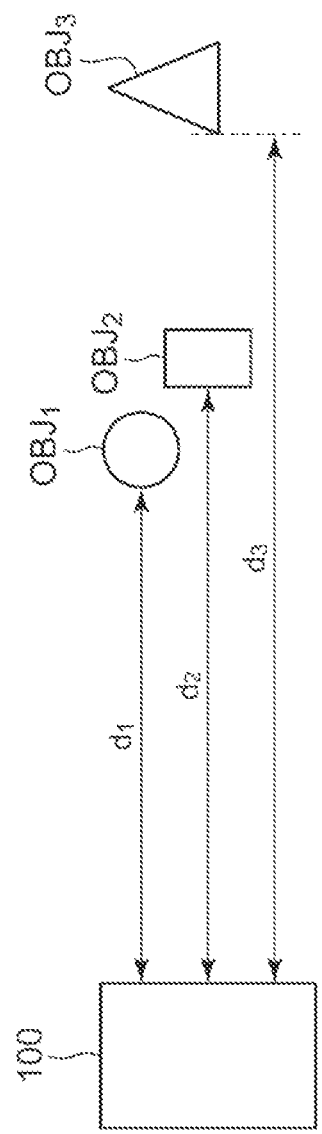
FIG. 6 is a diagram showing another image capture situation suitable for the use of the imaging apparatus shown in FIG. 4.

FIG. 6 is a diagram showing another image capture situation suitable for the use of the imaging apparatus 100 shown FIG. 4. Description will be made assuming that there are three objects $OBJ_1$ through $OBJ_3$ in front of the imaging apparatus 100 with the distances between them and the imaging apparatus 100 as $d_1$, $d_2$, and $d_3$.

Figure 7:
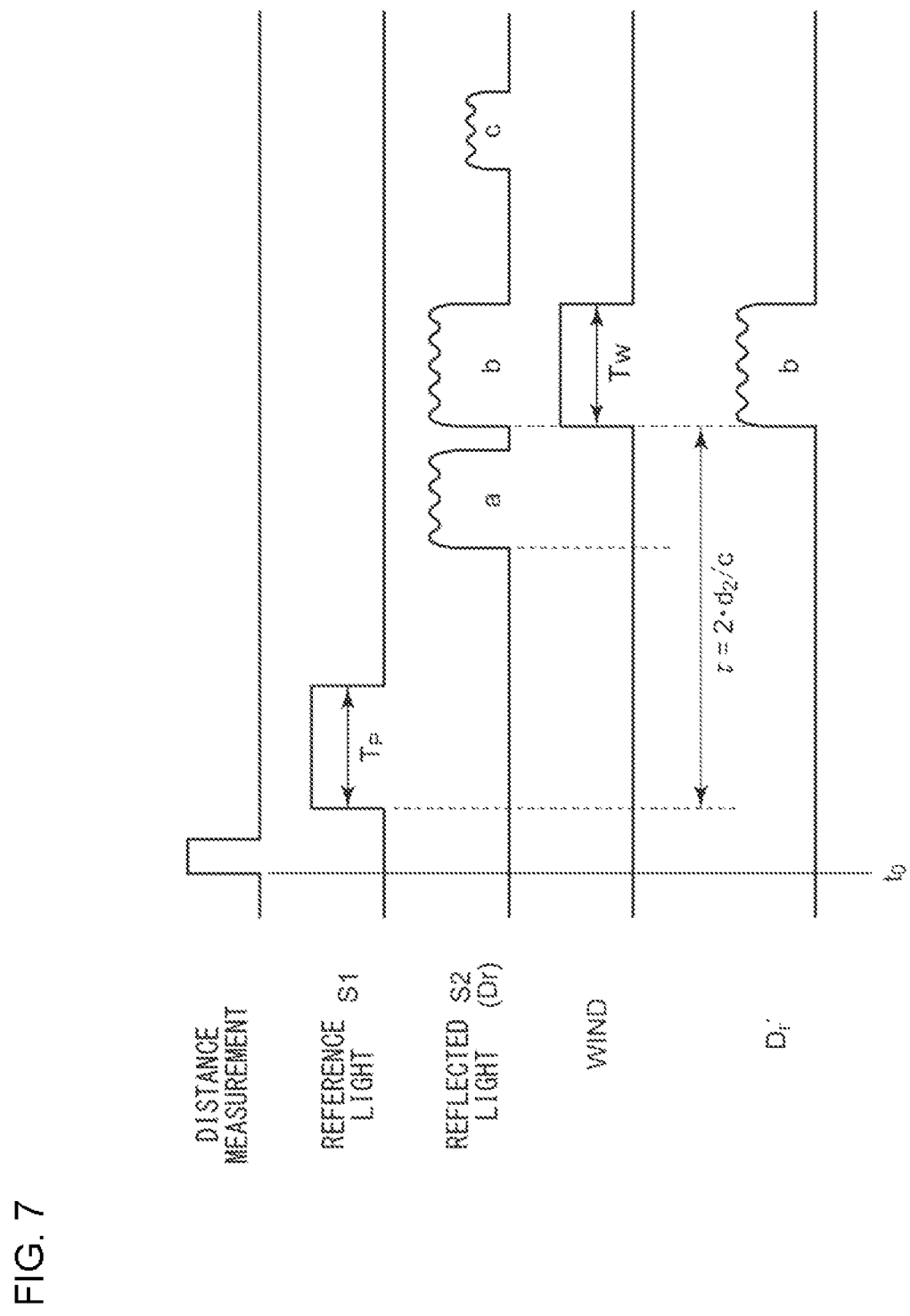
FIG. 7 is a time chart showing the operation of the imaging apparatus shown in FIG. 4 in the image capture situation shown in FIG. 6.

FIG. 7 is a time chart showing the operation of the imaging apparatus 100 shown in FIG. 4 in the image capture situation shown in FIG. 6. Description will be made assuming that the central object $OBJ_2$ is set to the target, for example. At the time point to before the irradiation of the reference light S1, the distance measurement sensor 140 detects the distance $d_2$ to the target $OBJ_2$. The reference light S1 is reflected by the three objects $OBJ_1$ through $OBJ_3$, and is incident to the photodetector 120. In this image capture situation, the reflected light S2 incident to the photodetector 120 includes reflected light components from the three objects $OBJ_1$ through $OBJ_3$. That is to say, the detection signal $D_r$ includes single components a through c that correspond to the three objects $OBJ_1$ through $OBJ_3$.

The window signal WIND is opened at the time point $t_2$ after a period $\tau(=2\times d_2/c)$ from the time point $t_1$, and is maintained in the open state during a predetermined period of time Tp. The open-state period of the window is set such that it substantially matches the period in which the reflected light from the target $OBJ_2$ is incident to the photodetector 120. Accordingly, such an arrangement is capable of extracting the signal $D_r'$ including only the signal component b using the window signal WIND. The correlation is calculated using the detection intensity $b_r$ based on the signal $D_r'$ thus extracted. This allows the effect of the objects $OBJ_1$ and $OBJ_3$ other than the target to be reduced, thereby providing the reconstructed image of the target $OBJ_2$.

As described above, with the imaging apparatus 100 according to the embodiment 1, when there are multiple objects at different distances, this is capable of capturing an image of only one object. It can be understood that the imaging apparatus 100 supports an operation of controlling the position of the image acquisition target, i.e., the focus.

Next, description will be made regarding modifications relating to the embodiment 1.

Modification 1

The light-receiving unit of the distance measurement sensor 140 and the photodetector 120 may be configured as a common component. This allows a cost increase due to the distance measurement sensor 140 configured as an additional component to be reduced.

Modification 2

Also, the light-emitting unit of the distance measurement sensor 140 and the illumination apparatus 110 may be configured using a common light source. This allows a cost increase due to the distance measurement sensor 140 configured as an additional component to be reduced.

Modification 3

Description has been made in the embodiment 1 regarding an arrangement in which the illumination apparatus 110 is configured as a combination of the light source 112 and the patterning device 114. However, the present invention is not restricted to such an arrangement. For example, the illumination apparatus 100 may be configured as an array of multiple semiconductor light sources (light-emitting diodes (LEDs) or laser diodes (LDs)) arranged in a matrix, and may be configured to be capable of controlling the on/off state (or luminance) of each semiconductor light source.

Embodiment 2

Figure 8:
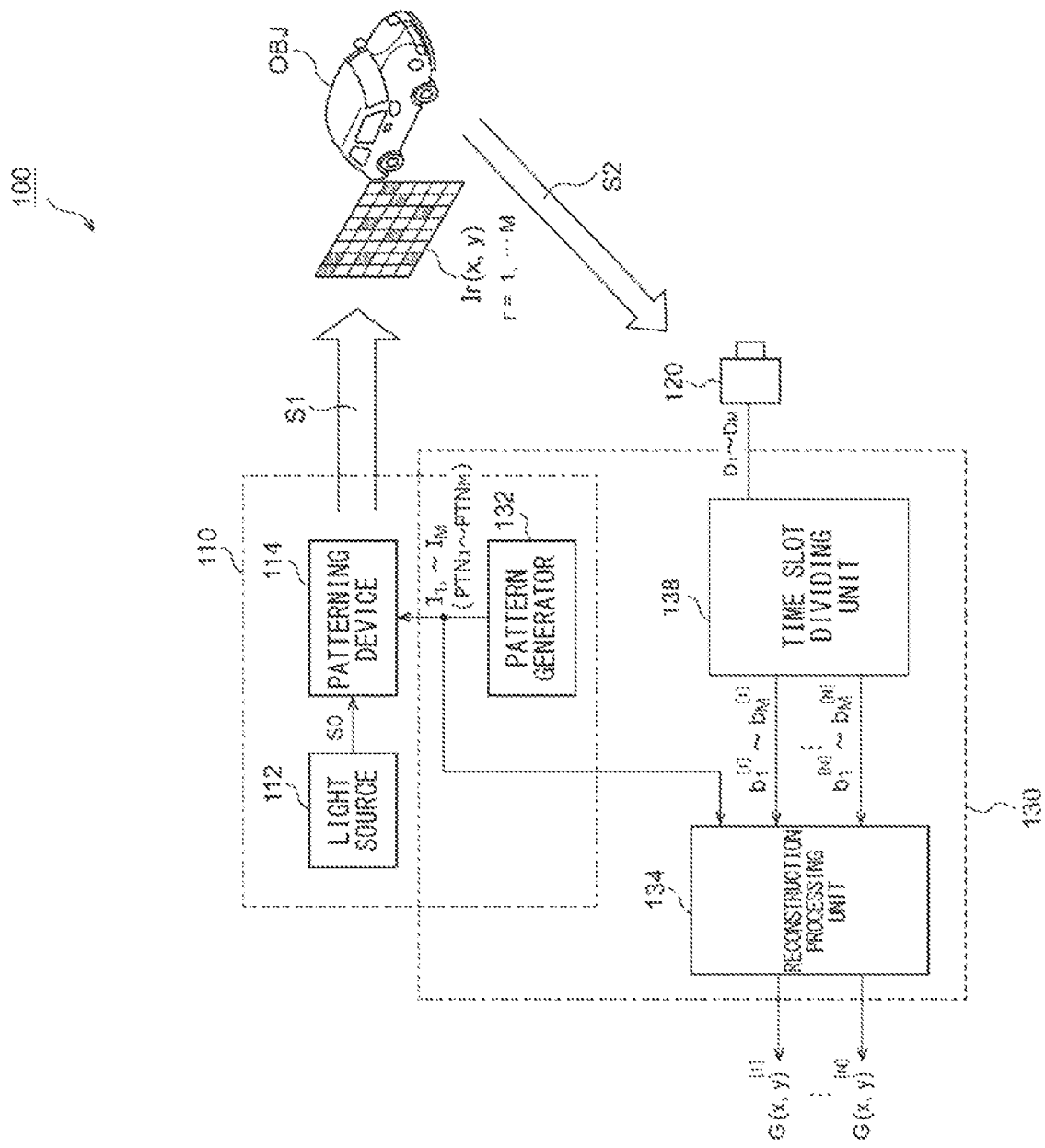
FIG. 8 is a diagram showing an imaging apparatus according to an embodiment 2.

FIG. 8 is a diagram showing an imaging apparatus 100 according to an embodiment 2. The imaging apparatus 100 is configured as a correlation function image sensor using the principle of ghost imaging. The imaging apparatus 100 includes an illumination apparatus 110, a photodetector 120, and a calculation processing device 130. The imaging apparatus 100 will also be referred to as a "quantum radar camera".

The illumination apparatus 110 is configured as a pseudo-thermal light source. The illumination apparatus 110 generates reference light S1 having a spatial intensity distribution I(x,y) that can be regarded as substantially random, and irradiates the reference light S1 to the object OBJ. The reference light S1 is sequentially pulse irradiated to the object OBJ while changing the intensity distribution at random a plurality of M times.

The illumination apparatus 110 includes a light source 112, a patterning device 114, and a pattern generator 132. The light source 112 generates light S0 having a uniform intensity distribution. As the light source 112, a laser, a light-emitting diode, or the like may be employed. The waveform and the spectrum of the reference light S1 are not restricted in particular. As the reference light S1, white light having multiple wavelengths or a continuous spectrum may be employed. Also, monochromatic light having a predetermined wavelength may be employed. The reference light S1 may also have a wavelength in the infrared region or ultraviolet region.

The patterning device 114 has multiple pixels arranged in a matrix. The patterning device 114 is configured to be capable of spatially modulating the light intensity distribution I based on the combination of the on/off states of the multiple pixels. In the present specification, a pixel set to the on state will be referred to as an "on pixel". On the other hand, a pixel set to the off state will be referred to as an "off pixel". It should be noted that, in the following description, for ease of understanding, description will be made assuming that each pixel is settable to only two values, i.e., 1 and 0. However, the present invention is not restricted to such an arrangement. Also, each pixel may be settable to an intermediate value.

As the patterning device 114, a reflective Digital Micromirror Device (DMD) or a transmissive liquid crystal device may be employed. The patterning device 114 receives the supply of a pattern signal PTN (image data) generated by the pattern generator 132.

The pattern generator 132 generates a pattern signal $PTN_r$ that indicates the light intensity distribution $I_r$ of the reference light S1. The pattern generator 132 sequentially switches the pattern signal $PTN_r$ (r=1, 2, ..., M) with time.

The photodetector 120 measures the reflected light from the object OBJ, and outputs a detection signal $D_r$. The detection signal $D_r$ is a spatially integrated value of the light energy (or intensity) incident to the photodetector 120 when reference light having the light intensity distribution $I_r$ is irradiated to the object OBJ. Accordingly, as the photodetector 120, a single-pixel photodetector can be employed. The photodetector 120 outputs multiple detection signals $D_1$ through $D_M$ that respectively correspond to the plurality of M kinds of light intensity distributions $I_1$ through $I_M$. The detection signals $D_r$ (r=1 to M) are each configured as an analog electrical signal, which are each converted into a digital signal by means of an A/D converter. The digital signal thus converted is acquired by the calculation processing device 130.

The calculation processing device 130 divides the time waveform of the detection signal $D_r$, which is an output of the photodetector 120, into a plurality of N (N≥2) time slots. The waveform (slot waveform) of the i-th (i=1, 2, ..., N) time slot detection signal will be represented by $D_r[i]$. The calculation processing device 130 generates a detection intensity $b_r[i]$ for each time slot based on the slot waveform $D_r[i]$. Subsequently, the calculation processing device 130 calculates a correlation between the detection intensities $b_1[1]$ through $b_r[i]$ and the intensity distributions $I_1(x,y)$ through $I_M(x,y)$ of the reference light, so as to reconstruct the reconstructed image $G(x,y)[i]$.

The calculation processing device 130 includes a pattern generator 132, a reconstruction processing unit 134, and a time slot dividing unit 138. The time slot dividing unit 138 divides the time waveform of the detection signal $D_r$, which is an output of the photodetector 120, into a plurality of N time slots, so as to output multiple detection intensities $b_r[1]$ through $b_r[N]$ that correspond to the plurality of time slots.

The configuration of the time slot dividing unit 138 is not restricted in particular. The time slot dividing unit 138 may be configured in the digital domain. Also, the time slot dividing unit 138 may be configured in the analog domain.

The relation between the detection intensity $b_r[i]$ and the slot waveform $D_r[i]$ may preferably be determined giving consideration to the kind of the photodetector 120, the method of detection, etc.

As the detection intensity $b_r[i]$ in a given time slot, an integrated value, an average value, or the maximum value of all the sampled values included in the corresponding slot waveform $D_r[i]$ may be employed. Alternatively, from among all the sampled values, some may be selected and used to calculate such an integrated value, average value, or maximum value to be employed as the detection intensity $b_r[i]$. For the selection of the multiple sampled values, x-th through y-th sampled values may be extracted in descending order from the maximum value, for example. Also, sampled values that are smaller than an arbitrary threshold value may be excluded. Also, sampled values with small signal fluctuation may be extracted.

The reconstruction processing unit 134 calculates the correlation between the multiple intensity distributions (which will also be referred to as "random patterns") $I_1$ through $I_M$ and the multiple detection intensities $b_1[i]$ through $b_M[i]$ for each time slot (i=1, 2, ... N), so as to reconstruct the reconstructed image $G(x, y)[i]$ for each time slot. The Expression (1) is used for the correlation calculation.

$$G(x, y)^{[i]} = \frac{1}{M}\sum_{r=1}^{M}[\{b_r^{[i]} - \langle b \rangle^{[i]}\} \cdot I_r(x, y)] \quad (1)$$

$$\langle b \rangle^{[i]} = \frac{1}{M}\sum_{r=1}^{M} b_r^{[i]}$$

The calculation processing device 130 can be implemented as a combination of a processor (hardware component) such as a Central Processing Unit (CPU), Micro Processing Unit (MPU), microcontroller or the like and a software program to be executed by the processor (hardware component). The calculation processing device 130 may be configured as a combination of multiple processors. Alternatively, the calculation processing device 130 may be configured as hardware only.

Figure 9:
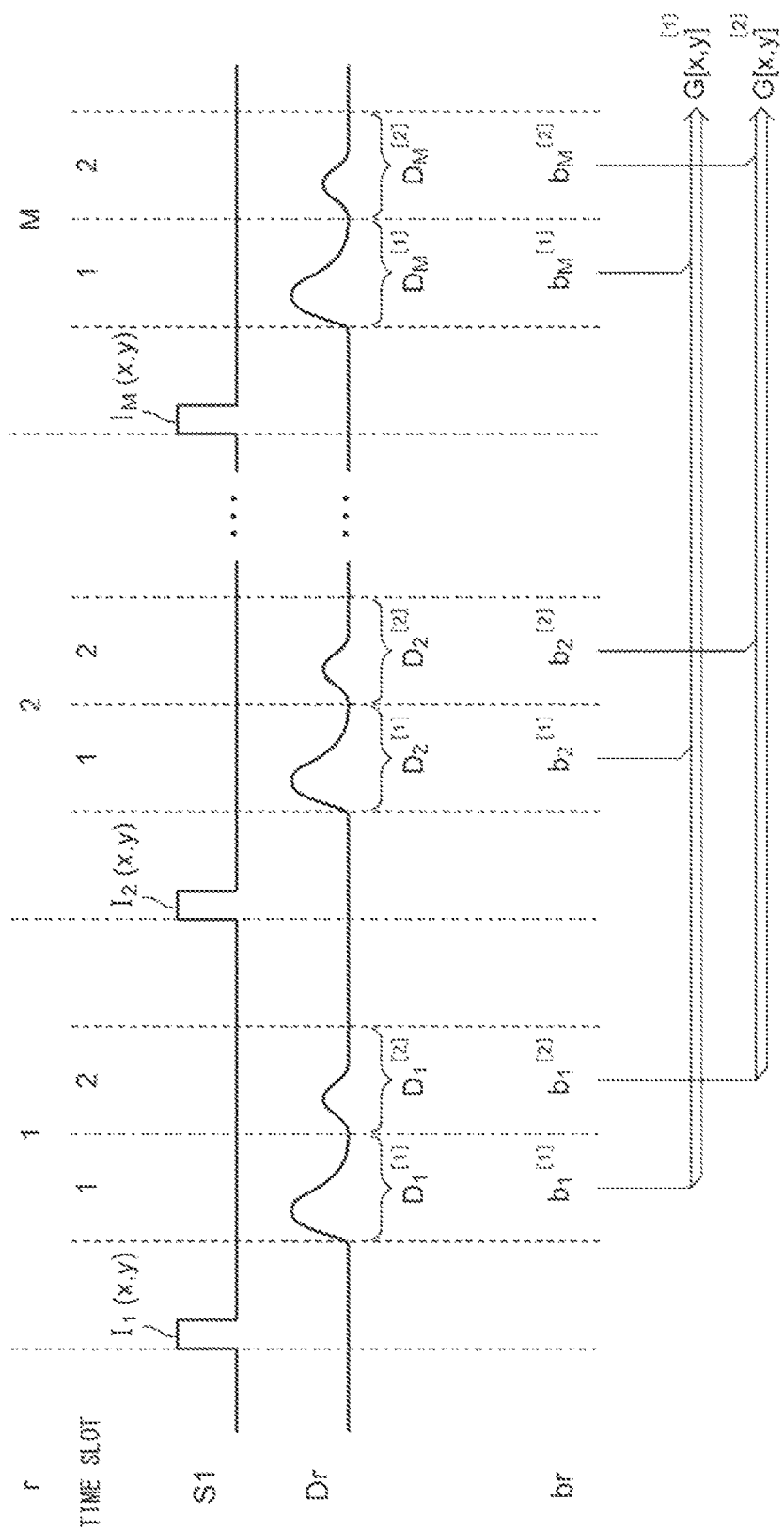
FIG. 9 is a diagram for explaining the operation of the imaging apparatus shown in FIG. 8.

The above is the configuration of the imaging apparatus 100. Next, description will be made regarding the operation thereof. FIG. 9 is a diagram for explaining the operation of the imaging apparatus 100 shown in FIG. 8. Description will be made below assuming the image capture situation as shown in FIG. 1 in which there are two objects $OBJ_1$ and $OBJ_2$ at different distances from the imaging apparatus 100.

For example, the distance $d_1$ to the object $OBJ_1$ is 15 m, and the distance $d_2$ to the object $OBJ_2$ is 30 m.

The reference light S1 is pulse irradiated while switching the intensity distribution between M patterns. When there are two objects at different distances, the output waveform $D_r$ of the photodetector 120 has two separate waveforms, i.e., has two peaks. The earlier waveform from among the two waveforms is associated with the reflected light from the nearer object $OBJ_1$. On the other hand, the later waveform is associated with the reflected light from the farther object $OBJ_2$.

In this example, the first waveform is included in the first (i=1) time slot. The second waveform is included in the second (i=2) time slot. With this, the detection intensities $b_r[1]$ and $b_r[2]$ are generated for each of the two time slots for every (every r-th) pulse irradiation.

Subsequently, calculation of the correlation between the detection intensity group $b_1[1], b_2[1], \ldots, b_M[1]$ acquired for the first time slot and the intensity distributions $I_1(x,y)$, $I_2(x,y), \ldots, I_M(x,y)$ is executed, so as to generate a reconstructed image $G(x,y)$ [1] of the nearer object. Similarly, calculation of the correlation between the detection intensity group $b_1[2], b_2[2], \ldots, b_M[2]$ acquired for the second time slot and the intensity distributions $I_1(x,y)$, $I_2(x,y), \ldots, I_M(x,y)$ is executed, so as to generate a reconstructed image $G(x,y)$ [2] of the farther object.

The above is the operation of the imaging apparatus 100. With the imaging apparatus 100 in which the waveform of the output signal of the photodetector 120 is divided into time slots and is processed for each time slot, this is capable of separating multiple objects located at different distances, thereby allowing the detection intensity to be acquired for each object. With such an arrangement in which a correlation is calculated for each time slot, this is capable of acquiring a reconstructed image for each time slot. The reconstructed image that corresponds to one time slot is a slice image of the front side of the imaging apparatus 100 divided in the depth direction. The reconstructed image reconstructed for each time slot has an improved image quality as compared with that of a single reconstructed image including the multiple objects. "Improved image quality" as used here means improved visibility and improved results or precision obtained in signal processing of the reconstructed image.

The multiple reconstructed images that correspond to the multiple time slots may be combined so as to generate a single final reconstructed image. Before combining the multiple reconstructed images, the brightness and contrast may be optimized for each of the multiple reconstructed images.

The delay time τ from a given timing at which the reference light is irradiated to a timing at which the reflected light reflected by an object positioned at a distance d is incident to the photodetector is represented by the following Expression.

τ=2×d/c

Here, c represents the speed of light. With this, τ can be associated with the time difference between the irradiation of the reference light and the time slot. By transforming this Expression, an approximate value of the distance d to the object can be calculated.

d=τ×c/2

Accordingly, the reconstructed image generated for each time slot may be stored in association with the distance information that corresponds to the time information (i.e., T) with respect to each time slot. This allows the imaging apparatus 100 to function as a distance measurement sensor.

Next, description will be made regarding a method for determining the position, width, and number of the time slots.

For example, the position, width, and number of the multiple time slots may be fixedly determined beforehand. For in-vehicle use, for example, the measurement ranges may be determined to be a range of 5 to 10 m, a range of 10 to 30 m, a range of 50 to 100 m, etc. Also, the position and width of the time slots may be determined so as to allow an image of an object included in each measurement range to be captured.

Also, the position and width of the multiple time slots may be dynamically determined based on the shape of the waveform of the output signal of the photodetector 120.

Also, in a case in which the distances to the multiple objects can be measured, the position and width of the multiple time slots may be dynamically determined based on the distance information thus measured.

Embodiment 3

Figure 10:
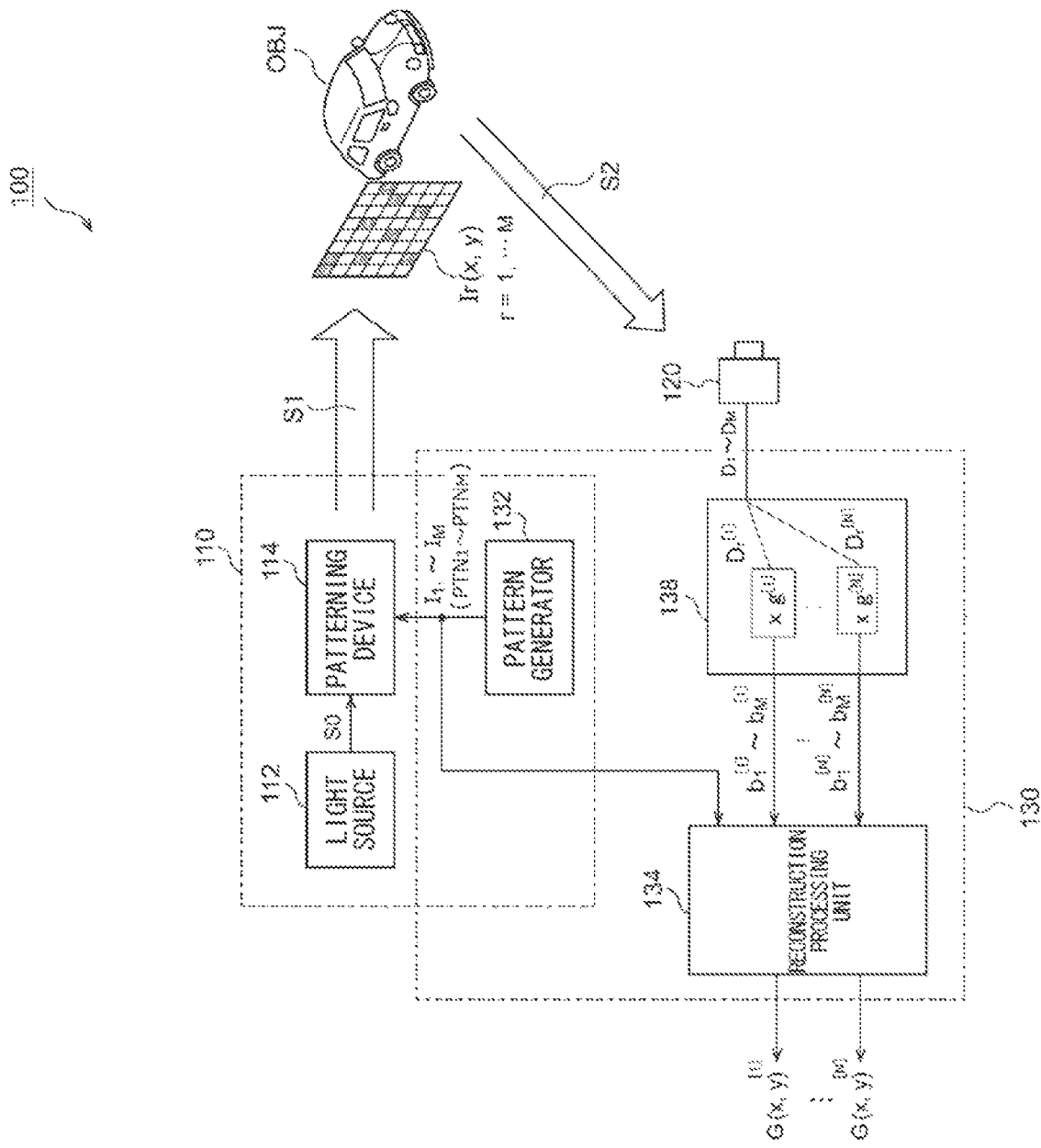
FIG. 10 is a diagram showing an example configuration of the imaging apparatus according to an embodiment 3.

FIG. 10 is a diagram showing an example configuration of an imaging apparatus 100A according to an embodiment 3. In the embodiment 3, the ratio of the detection intensity $b_r[i]$ with respect to the intensity of the light incident to the photodetector 120 (gain g[i]) is raised as the time slot becomes later.

Specifically, the conversion gain g[i] in conversion processing from the slot waveform $D_r[i]$ into the detection intensity $b_r[i]$ supported by the time slot dividing unit 138 is raised as the time slot becomes later.

Figure 11A:
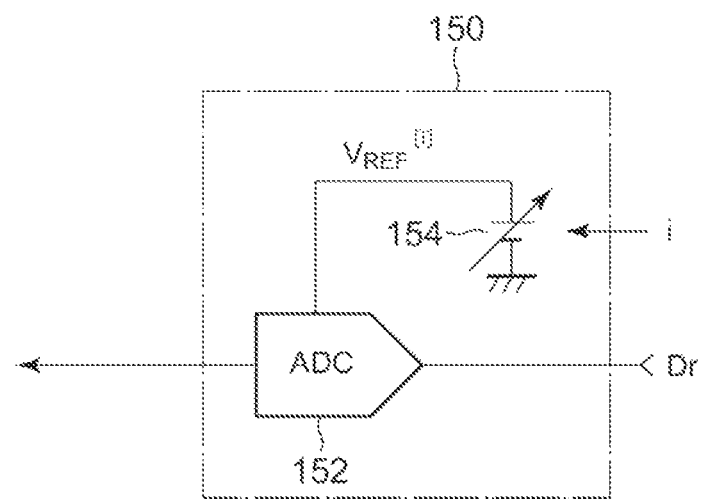
FIGS. 11A and 11B are diagrams each showing an example configuration of a time slot dividing unit shown in FIG. 10.
Figure 11B:
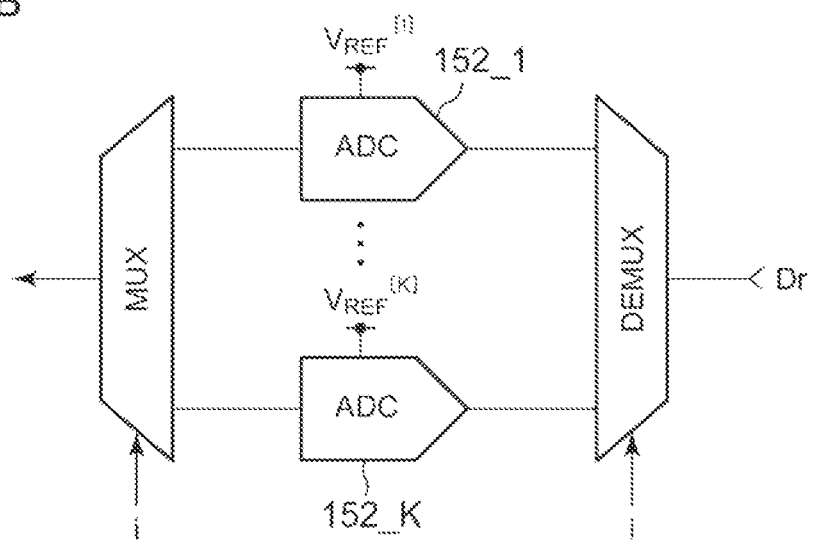

FIGS. 11A and 11B are diagrams each showing an example configuration of the time slot dividing unit 138 shown in FIG. 10. The time slot dividing unit 138 includes a digitizer 150 that converts an output signal of the photodetector 120 into a digital signal. The time slot dividing unit 138 is configured to raise the width of 1 LSB (Least Significant Bit) of the digitizer 150 as the time slot 150 becomes later.

In FIG. 11A, the digitizer 150 includes a single A/D converter 152 and a variable voltage source 154. The variable voltage source 154 generates a reference voltage $V_{REF}[i]$ that corresponds to the number of the time slot, and supplies the reference voltage $V_{REF}[i]$ thus generated to the A/D converter 152. As the time slot becomes later, the reference voltage $V_{REF}[i]$ to be set becomes lower. The following relation expression holds true between the reference voltage $V_{REF}[i]$ to be set for the i-th time slot and the reference voltage $V_{REF}[j]$ to be set for the j-th time slot.

$$V_{REF}[i] \geq V_{REF}[j] (i < j)$$

In FIG. 11B, the digitizer 150 includes multiple A/D converters 152_1 through 152_K. Different reference voltages $V_{REF}[i]$ through $V_{REF}[K]$ are supplied to the multiple A/D converters 152_1 through 152_K. The following relation expression holds true between the reference voltages $V_{REF}[1]$ through $V_{REF}[K]$.

$$V_{REF}[1] > V_{REF}[2] > \ldots > V_{REF}[K]$$

Each of the multiple A/D converters 152_1 through 152_K includes a demultiplexer DEMUX as its upstream stage, and a multiplexer MUX as its downstream stage. With this, the multiple A/D converters are switched so as to use a corresponding A/D converter for each time slot in a time-division manner.

As the time slot becomes later, the intensity (amplitude) of the detection signal $D_r$ becomes lower. Accordingly, in a case in which the same reference voltage $V_{REF}$ is applied to the A/D converters 152, as the time slot becomes later, the digital signal value generated by the A/D converter 152 becomes smaller. This leads to a difficulty in detecting the change in the energy for each irradiation pattern (intensity distribution). In contrast, with the present embodiment in which the reference voltage $V_{REF}$ of the A/D converter 152 is reduced as the time slot becomes later, this is capable of raising the detection sensitivity for a small change in the energy for each irradiation pattern (intensity distribution). This provides improved image quality of an image of a farther object included in a later time slot.

Next, description will be made regarding modifications relating to the embodiments 2 and 3.

Modification 1

Figure 12A:
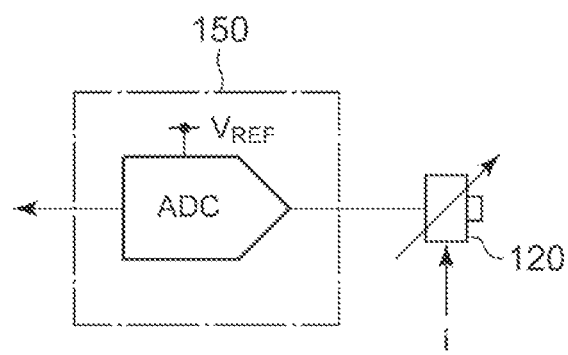
FIGS. 12A through 12C are diagrams each showing a modification of the imaging apparatus according to the embodiment 3.
Figure 12B:
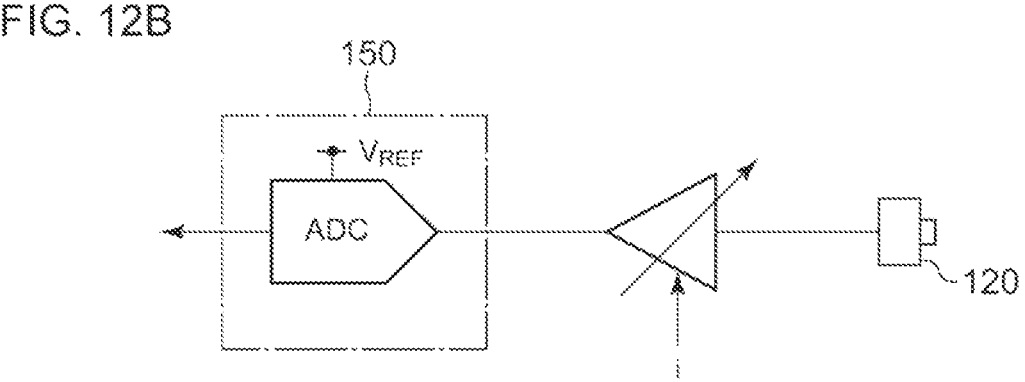
Figure 12C:
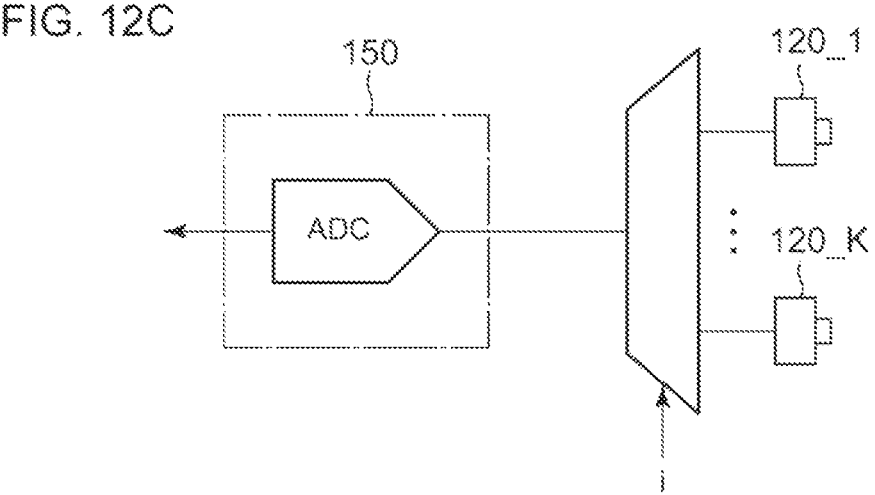

Description will be made regarding a modification of the embodiment 3. FIGS. 12A through 12C are diagrams each showing a modification of the imaging apparatus 100A according to the embodiment 3. In FIG. 12A, the imaging apparatus 100A is provided with a photodetector 120 having a variable sensitivity that is controlled according to the time slot. In FIG. 12B, the imaging apparatus 100A is provided with a variable amplifier that amplifies an output signal of the photodetector 120. The gain of the variable amplifier is controlled according to the time slot. In FIG. 12C, the imaging apparatus 100A is provided with multiple photodetectors 120_1 through 120_K having different respective sensitivities. The multiple photodetectors 120_1 through 120_K are each used for the corresponding time slot in a time-division manner. A photodetector 120 having a higher sensitivity is used for a time slot that is later.

Modification 2

Description has been made in the embodiments 2 and 3 regarding an arrangement in which the illumination apparatus 110 is configured as a combination of the light source 112 and the patterning device 114. However, the present invention is not restricted to such an arrangement. For example, the illumination apparatus 110 may be configured as an array of multiple semiconductor light sources (light-emitting diodes (LEDs) or laser diodes (LDs)) arranged in a matrix. Also, each semiconductor light source may be configured such that its on/off state (or light intensity) can be individually controlled.

Usage

Figure 13:
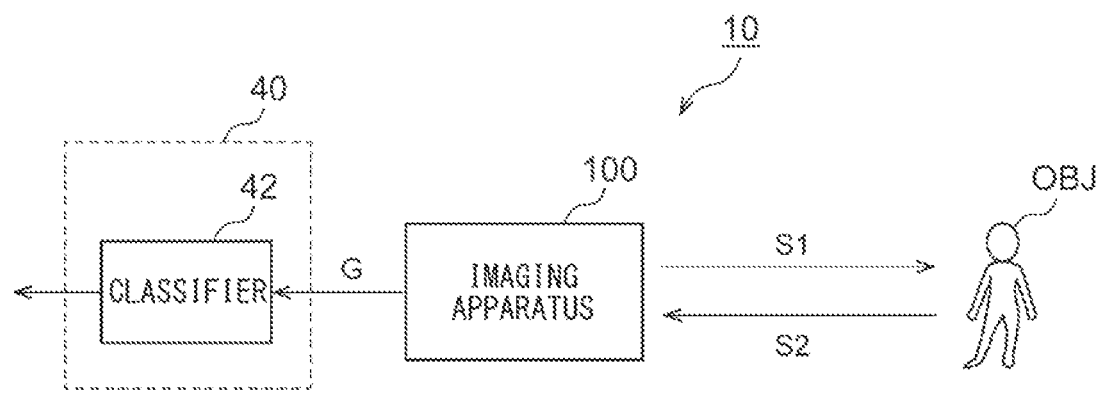
FIG. 13 is a block diagram showing an object identification system.

Next, description will be made regarding the usage of the imaging apparatus 100. FIG. 13 is a block diagram showing an object identification system 10. The object identification system 10 is mounted on a vehicle such as an automobile, motorcycle, or the like. The object identification system 10 judges the kind (category) of an object OBJ that exists in the vicinity of the vehicle.

The object identification system 10 includes the imaging apparatus 100 and a calculation processing device 40. As described above, the imaging apparatus 100 irradiates the reference light S1 to the object OBJ, and measures the reflected light S2, so as to generate a reconstructed image G.

The calculation processing device 40 processes the output image G output from the imaging apparatus 100, and judges the position and the kind (category) of the object OBJ.

A classifier 42 included in the calculation processing device 40 receives the image G as its input, and judges the position and the kind of the object OBJ included in the image G. The classifier 42 is implemented based on a model generated by machine learning. The algorithm employed by the classifier 42 is not restricted in particular. Examples of algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

The above is the configuration of the object identification system 10. With such an arrangement employing the imaging apparatus 100 as a sensor of the object identification system 10, this provides the following advantages.

With such an arrangement employing the imaging apparatus 100, i.e., a quantum radar camera, this provides dramatically improved noise resistance. For example, when the vehicle travels in rain, snow, or fog, it is difficult to recognize the object OBJ with the naked eye. In contrast, with such an arrangement employing the imaging apparatus 100, this allows a reconstructed image G of the object OBJ to be acquired without the effects of rain, snow, or fog.

With the imaging apparatus 100, this allows the calculation delay to be reduced. This provides low-delay sensing. In particular, for in-vehicle use, in some cases, the object OBJ moves at high speed. Accordingly, such low-delay sensing provides a very large advantage.

Figure 14:
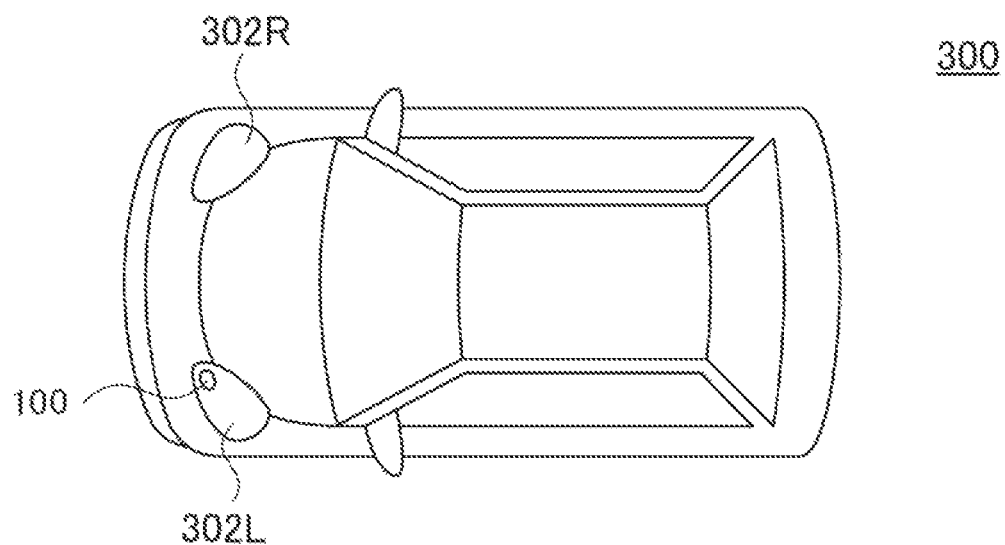
FIG. 14 is a block diagram showing an automobile provided with an object identification system.

FIG. 14 is a diagram showing an automobile provided with the object identification system 10. An automobile 300 is provided with headlamps 302L and 302R. The imaging apparatus 100 is built into at least one from among the headlamps 302L and 302R. Each headlamp 302 is positioned at a frontmost end of the vehicle body, which is most advantageous as a position where the imaging apparatus 100 is to be installed for detecting an object in the vicinity.

Figure 15:
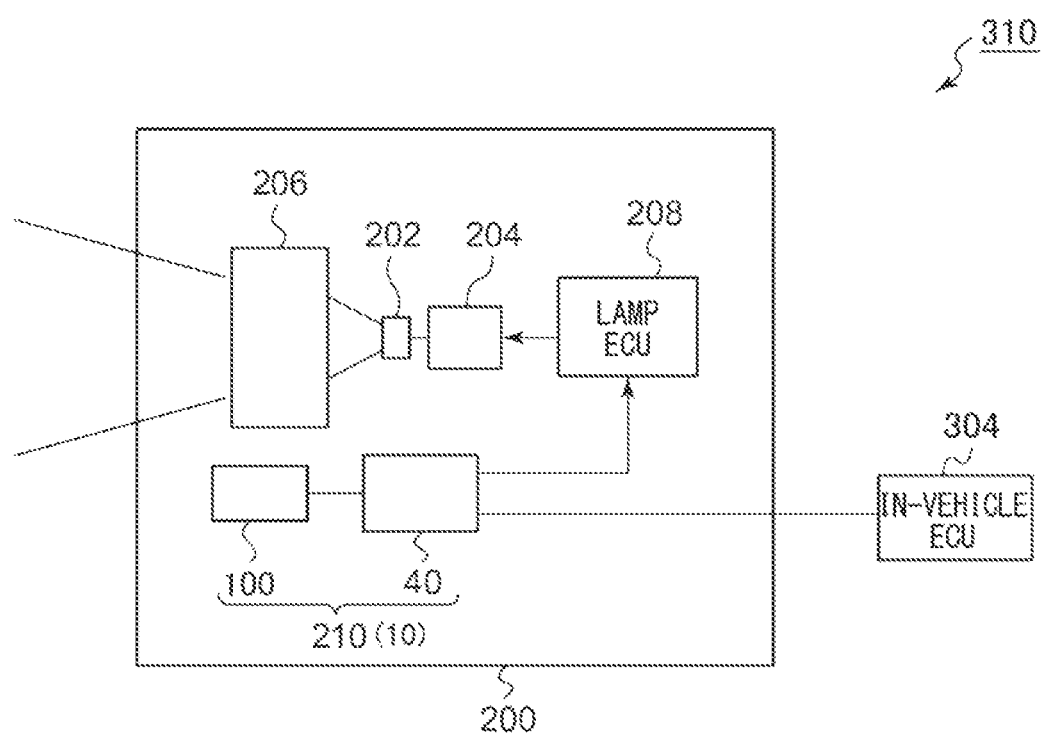
FIG. 15 is a block diagram showing an automotive lamp provided with an object detection system.

FIG. 15 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the imaging apparatus 100 and the calculation processing device 40.

Also, the information with respect to the object OBJ detected by the calculation processing device 40 may be used to support the light distribution control operation of the automotive lamp 200. Specifically, a lamp ECU 208 generates a suitable light distribution pattern based on the information with respect to the kind of the object OBJ and the position thereof generated by the calculation processing device 40. The lighting circuit 204 and the optical system 206 operate so as to provide the light distribution pattern generated by the lamp ECU 208.

Also, the information with respect to the object OBJ detected by the calculation processing device 40 may be transmitted to the in-vehicle ECU 304. The in-vehicle ECU may support autonomous driving based on the information thus transmitted.

While the preferred embodiments of the present disclosure have been described using specific terms, such description is for illustrative purposes only, and it is to be understood that changes and variations may be made without departing from the spirit or scope of the appended claims.

What is claimed is:

1. An imaging apparatus comprising:
    an illumination apparatus structured to sequentially irradiate M reference lights, each having a spatially random intensity distribution;
    a photodetector structured to measure light reflected from an object; and
    a calculation processing device structured to generate N reconstructed images based on M output signals of the photodetector corresponding to irradiation with the M reference lights,
    wherein the calculation processing device is structured to:
        divide each of the M output signals of the photodetector into N time slots, and generate a detected intensity for each time slot,
        and when an intensity distribution of an r-th reference light, where $1 \leq r \leq M$, is represented as $I_r(x, y)$, and a detected intensity in an i-th time slot, where $1 \leq i \leq N$, under irradiation of the r-th reference light is represented as $b_r^{[i]}$,
    reconstruct an i-th reconstructed image $G(x, y)^{[i]}$ based on a correlation calculation between the detected intensities $b_1^{[i]}$ to by $b_M^{[i]}$ and the intensity distributions $I_1(x, y)$ to $I_M(x, y)$.

2. The imaging apparatus according to claim 1, wherein a ratio of the detection intensity with respect to an intensity of light incident to the photodetector is raised as the time slot becomes later.

3. The imaging apparatus according to claim 1, wherein the calculation processing device comprises a digitizer structured to convert an output signal of the photodetector into a digital signal,
    and wherein a width of 1 LSB (Least Significant Bit) of the digitizer is increased as the time slot becomes later.

4. The imaging apparatus according to claim 3, wherein the digitizer comprises a single A/D converter,
    and wherein a reference voltage to be supplied to the A/D converter is lowered as the time slot becomes later.

5. The imaging apparatus according to claim 3, wherein the digitizer comprises a plurality of A/D converters to which different reference voltages are supplied,
    and wherein the multiple A/D converters are each used for a corresponding time slot in a time-division manner.

6. The imaging apparatus according to claim 1, further comprising at least one photodetector having a different sensitivity,
    wherein, as the time slot becomes later, a photodetector having a higher sensitivity is used.

7. The imaging apparatus according to claim 1, wherein an image reconstructed for each time slot is stored together with distance information that corresponds to time information with respect to each time slot.

8. An automotive lamp comprising the imaging apparatus according to claim 1.

9. A vehicle comprising the imaging apparatus according to claim 1.

* * * * *